(12) United States Patent
Vonder et al.

(10) Patent No.: US 9,672,731 B2
(45) Date of Patent: Jun. 6, 2017

(54) SYSTEM, A PROCESSING UNIT, A METHOD AND A COMPUTER PROGRAM PRODUCT FOR MONITORING SENSORS

(75) Inventors: Matthijs Raymond Vonder, Delft (NL); Erik Alle Fokko Langius, Delft (NL); Bram Dirk Van Der Waaij, Delft (NL)

(73) Assignee: NEDERLANDSE ORGANISATIE VOOR TOEGEPAST-NATUURWETEN-SCHAPPELIJK ONDERZOEK TNO, Delft (NL)

( * ) Notice: Subject to any disclaimer, the term of this patent is extended or adjusted under 35 U.S.C. 154(b) by 240 days.

(21) Appl. No.: 13/976,148

(22) PCT Filed: Dec. 27, 2011

(86) PCT No.: PCT/NL2011/050903
§ 371 (c)(1),
(2), (4) Date: Jul. 31, 2013

(87) PCT Pub. No.: WO2012/091567
PCT Pub. Date: Jul. 5, 2012

(65) Prior Publication Data
US 2013/0328694 A1   Dec. 12, 2013

(30) Foreign Application Priority Data

Dec. 30, 2010  (EP) ..................................... 10197393
Sep. 21, 2011  (EP) ..................................... 11182212

(51) Int. Cl.
G08C 19/16   (2006.01)
G08C 25/00   (2006.01)
(Continued)

(52) U.S. Cl.
CPC ............... *G08C 25/00* (2013.01); *H04Q 9/02* (2013.01); *G08B 29/126* (2013.01); *H04Q 2209/823* (2013.01); *H04Q 2209/86* (2013.01)

(58) Field of Classification Search
CPC combination set(s) only.
See application file for complete search history.

(56) References Cited

U.S. PATENT DOCUMENTS 4,556,873 A * 12/1985 Yamada ................. G08B 17/10
                                                              250/574
5,764,142 A *  6/1998 Anderson .............. G01D 3/032
                                                              340/506

(Continued)

FOREIGN PATENT DOCUMENTS

CN      101557606        10/2009
CN      101573709 A      11/2009
(Continued)

*Primary Examiner* — Joseph Feild
*Assistant Examiner* — Rufus Point
(74) *Attorney, Agent, or Firm* — Husch Blackwell LLP

(57) ABSTRACT

The invention relates to a sensor monitoring system comprising at least one sensor (101, 102, 103) and a processing unit (150), wherein the sensor is arranged to transmit during a plurality of successive time periods data items to the processing unit and the processing unit is arranged to receive the data items from the said at least one sensor, the processing unit being further arranged for: determining for at least some time periods from the said plurality of successive time periods a number of corresponding data items; comparing between the at least some time periods the number of the corresponding data items; deducing for the at least some time periods a parameter associated with a variation in the number of data items per said some time periods. The invention further relates to a processing unit, and a method and a computer program for sensor monitoring.

20 Claims, 2 Drawing Sheets

(51) Int. Cl.
*H04Q 9/02* (2006.01)
*G08B 29/12* (2006.01)

(56) References Cited

U.S. PATENT DOCUMENTS

| | | | | |
|---|---|---|---|---|
| 6,222,456 | B1* | 4/2001 | Tice | G08B 17/107 250/574 |
| 6,253,159 | B1* | 6/2001 | Bett | G05B 19/41875 702/159 |
| 6,339,373 | B1* | 1/2002 | Zeskind | G08B 29/04 340/10.1 |
| 6,624,750 | B1* | 9/2003 | Marman | G08B 25/003 340/4.3 |
| 6,826,477 | B2* | 11/2004 | Ladetto | G01C 21/16 340/944 |
| 6,826,607 | B1* | 11/2004 | Gelvin | B60R 25/1004 340/539.19 |
| 6,967,582 | B2* | 11/2005 | Tice | G08B 17/10 340/522 |
| 7,050,943 | B2 | 5/2006 | Kauffman et al. | |
| 7,075,424 | B1* | 7/2006 | Sundaresan | G01N 29/14 340/500 |
| 7,369,057 | B2* | 5/2008 | Twerdochlib | F01D 17/02 250/370.01 |
| 7,489,136 | B1* | 2/2009 | Poland | G01R 31/2829 324/522 |
| 8,503,943 | B2* | 8/2013 | Spanhake | H04Q 9/00 340/636.1 |
| 8,766,807 | B2* | 7/2014 | Gonzales | G08B 29/185 340/628 |
| 2003/0105544 | A1* | 6/2003 | Kauffman | G05B 23/0224 700/109 |
| 2003/0200784 | A1* | 10/2003 | Smith, Jr. | G01D 3/028 73/1.01 |
| 2004/0133387 | A1 | 7/2004 | Volkel | |
| 2004/0249590 | A1* | 12/2004 | Ota | G01D 9/005 702/79 |
| 2006/0136157 | A1* | 6/2006 | Sun | H03H 17/0294 702/75 |
| 2006/0143439 | A1* | 6/2006 | Arumugam | G06Q 10/08 713/153 |
| 2007/0063859 | A1* | 3/2007 | Twerdochlib | F01D 17/02 340/679 |
| 2008/0146215 | A1* | 6/2008 | Oota | H04L 1/0017 455/422.1 |
| 2009/0303009 | A1* | 12/2009 | Itasaki | H04Q 9/00 340/10.1 |
| 2009/0303034 | A1* | 12/2009 | Abedi | G06Q 10/04 340/539.1 |
| 2010/0008286 | A1* | 1/2010 | Abedi | G01D 21/00 370/315 |
| 2010/0033122 | A1* | 2/2010 | Hartman | H02P 29/0241 318/490 |
| 2010/0085199 | A1* | 4/2010 | Gonzales | G08B 29/043 340/629 |
| 2015/0022345 | A1* | 1/2015 | Matsuoka | G08B 25/002 340/527 |

FOREIGN PATENT DOCUMENTS

| | | |
|---|---|---|
| WO | 2009134133 | 11/2009 |
| WO | 2010111740 | 10/2010 |

* cited by examiner

SYSTEM, A PROCESSING UNIT, A METHOD AND A COMPUTER PROGRAM PRODUCT FOR MONITORING SENSORS

CROSS REFERENCE TO RELATED APPLICATIONS

The present application is the national phase of PCT Patent Application No. PCT/NL2011/050903 filed Dec. 27, 2011, which claims priority to European Patent Application No. 10197393, filed Dec. 30, 2010, and also claims priority to European Patent Application No. 11182212, filed Sep. 21, 2011 the entire content of each application is incorporated by reference herein.

FIELD OF THE INVENTION

The invention relates to a system for monitoring sensors. In particular, the invention relates to a system for monitoring data communication from the sensors.

The invention further relates to a processor for enabling sensor monitoring.

The invention still further relates to a processing unit for use with a system for monitoring sensors.

The invention still further relates to a method for sensor monitoring.

The invention still further relates to a computer program product for sensor monitoring.

BACKGROUND OF THE INVENTION

Conventionally, a sensor system which may be used for monitoring a value of a parameter, such as temperature, for example, may comprise a plurality of sensor units, each containing one or more sensors, and a central unit for collecting, and possibly processing, data from the sensor units. To this end, sensor units are typically arranged for transmitting data items to the central unit, either by wire (using copper and/or optical fiber) or wirelessly (using for example RF, infrared, magnetic, and/or acoustic transmission).

The data items may be data packets containing values obtained by the sensors. Usually, these values are digital values, for example, sampled values of an analogue physical phenomenon such as temperature. In such a case, the data items will contain data samples. The data items may also be constituted by a single (digital) value, such as a single byte representing a meter reading. In the present document, the word "sample" may therefore also refer to a data item transmitted by a sensor unit. Such a "sample" may thus contain one or more sampled values. The number of "samples" transmitted per time unit (e.g. second, hour or day) may then be referred to as "sample rate". In other words, the term "sample rate" as used here represents the number of data items transmitted per unit of time and may therefore also be referred to as data item rate.

A data item rate may be determined by the sensor units so that the sensors are not polled. Instead, the sensor units determine the rate at which they send data items. This rate may be defined by a timer or clock which is internal to the sensor units so as to produce sensor values at a (more or less) fixed rate, but may also be determined by the values measured by the sensors: some sensor units may only transmit a data item when a sensor has detected a change in the sensed value. In either case, the central (or processing) unit can typically not influence the rate at which it receives data items.

In a sensor system, it is important to be able to detect abnormal behavior of the sensor units. That is, it should be detected when a sensor (or sensor unit) fails, or when a sensor detects an unusual condition. In a sensor system, it is desirable if the sensor units are monitored so as to automatically detect abnormal conditions. In a sensor system in which the sensor units produce data autonomously, that is, in which the sensor units are not polled, this is complicated by the fact that the monitoring unit, typically the central (or processing) unit, depends on the data items received. An absence of received data items over a prolonged period of time may be indicative of an abnormal condition. However, it is a problem of the sensors units known in the art that they are not suited to decide automatically whether an abnormal condition has occurred.

SUMMARY OF THE INVENTION

It is an object of the present invention to provide a sensor monitoring system in which unusual conditions in operation of a sensor can be detected automatically. It is a further object of the invention to provide a sensor monitoring system in which unusual conditions can be detected quickly and efficiently while avoiding false detections as much as possible.

To this end the system according to the invention comprises at least one sensor and a processing unit, wherein the sensor is arranged to transmit during a plurality of successive time periods data items to the processing unit and the processing unit is arranged to receive the data items from the said at least one sensor, the processing unit being further arranged for:
  determining for at least some time periods from the said plurality of successive time periods a number of corresponding data items;
  comparing between at least some time periods the number of the corresponding data items;
  deducing for at least some time periods a parameter associated with a variation in the number of data items per said some time periods.

It is found that by comparing, for at least some time periods, the number of data items received with the number of data items received in previous time periods, it is possible to identify in which time periods an unusual number of data items were received. This identification is simplified by determining a measure of change. It then becomes possible to monitor only this measure of change to detect unusual conditions. It will be appreciated that an unusual number of data items may be unusually high (e.g. twice as many as usual) or unusually low (e.g. no data items at all). However, it will be appreciated that said determining, comparing and deducing is carried out for each time period forming the said plurality of time periods. It will be appreciated that the at least one sensor may be configured for transmitting the said data items wirelessly. However, other ways of data transmission, such as electronic or optical is contemplated as well. It will be appreciated that the time periods may be overlapping.

In an embodiment of the sensor monitoring system according to the invention the said parameter is used for triggering an alarm when the parameter exceeds a threshold.

It is found that the parameter associated with a variation of the number of data items per respective time periods is a reliable way for monitoring the sensor operation.

A value of the threshold for triggering an alarm may be pre-determined. However, in an alternative embodiment the value of the threshold may be determined dynamically. In this way the sensor monitoring system according to the invention may be self-learning, which is advantageous in cases when the measured data item rate varies substantially.

In a still further embodiment of the sensor monitoring system according to the invention the processing unit comprises a buffer for buffering the data items.

In a still further embodiment of the sensor monitoring system the time periods in which the number of received data items is determined are preferably chosen in such a way that normally more than one data item is received, preferably between three and ten data items. By choosing the time period in such a way that more than one data item is received, the sensitivity to relatively small deviations in arrival times of the data items is significantly decreased.

The invention still further relates to a processing unit for use in a sensor monitoring system comprising at least one sensor, wherein the sensor is arranged to transmit during a plurality of successive time periods data items to the processing unit and the processing unit is arranged to receive the data items from the said at least one sensor being further arranged for:
- determining for at least some time periods from the said plurality of successive time periods a number of corresponding data items;
- comparing between at least some time periods the number of the corresponding data items;
- deducing for at least some time periods a parameter associated with a variation in the number of data items per said some time periods.

In an embodiment of the sensor monitoring system and/or the processing unit, the processing unit is configured based on a detected duration (Delta) between the successive transmissions of the data items. It will be appreciated that the system may be initialized using a configurable parameter (Dinit). In the following examples the term 'changeability' represents an embodiment of the parameter associated with a variation in the number of data items per time periods.

In this particular embodiment (variant A) the following operational parameters for the processing unit may be configured:

Dinit=minimum delta-time for timer to go off next time (in init fase)
Output
changeability=changeability of the received signal,
   0 means: no changeability
   a positive number: more samples received than expected
   a negative number: less samples received than expected
Other Parameters
Delta="temporary variable": used for calculating new wakeup time
T_wakeup=the time the timer went of and the next sequence of calculating is started
N_received=the received amount of signal inputs when the timer went off
T_last_arrival=last time a sample arrived
T_forlast_arrival=time before the last time a sample arrived
The sensor monitoring system and/or the processing unit may function according the following "pseudo" code:

```
Config
D_init = 10    // to start the system an initial sleep-time value is configured
Init
T_forlast_arrival = 0
T_last_arrival = 0
Tnow = 0
N_received = 0
SetTimer(D_init)       // go to sleep for time = D_init
Two parallel processes (endless)
1. When a sample arrives do
      T_forlast_arrival = T_last_arrival    // shift
      T_last_arrival = now( )               // look at the clock
      N_received = N_received + 1           // increase counter
2. When the timer goes of do
      calculate_and_show_changeability    // for description see below
Procedure: calculate_and_show_changeability
{
Tnow = now( )                              // look at the clock
changeability = N_received − 1
    // changeability = −1 means: no samples received
    // changeability = 0 means: exactly the amount of samples received as expected,
    //                so no changeability
    // changeability = positive: more samples received than expected
if Nreceived = 0
    then
          Delta = Tnow − Tlast_arrival
              // will increase after period of no arrivals
          Twakeup = Tnow + Delta
    else
          Delta = T_last_arrival − T_forlast_arrival;
              // last real sample time
          Twakeup = T_last_arrival + Delta
              // do not calculate from now!
          if Twake up < =Tnow; then Twakeup = Tnow + Delta;
N_received = 0;          // reset the counter
Return(changeability)    // return the changeability as output parameter
SetTimer(Twakeup)        // set timer to go off at T_wakeup
                         // and go to sleep

}
```

In a further embodiment of the sensor monitoring system and/or the processing unit, an interval of allowable values is defined for the said duration. In this particular embodiment (variant D) a tolerance about a specific average value of the duration is defined. This may be embodied by the following algorithm.

To make the algorithm less sensitive for small deviations in the sample time (e.g. if the sample time is successively 60, 58, 62, 59, 61 seconds) the average is 60 sec. but the changeability result will be most of the time not equal to zero. Therefore we introduce a factor alpha to enlarge the sleep time Typically a value between 1.1 and 1.5. When using alpha=1.1 in the example above, the sleep time will be 66, 64, 68 etc. So small deviations around the average sample time will be ignored. Using alpha=1.0 the version as is discussed in the foregoing is regained.

The sensor monitoring system and/or the processing unit may function according the following "pseudo" code:

```
Config
D_init = 10     // to start the system an initial sleep-time value is configured
alpha = 1.1     // to make the algorithm less sensitive for small deviations in
                //             sample time
Init
T_forlast_arrival = 0
T_last_arrival = 0
Tnow = 0
N_received = 0
SetTimer(D_init)                        // go to sleep for time = D_init
Two parallel processes (endless)
1. When a sample arrives do
        T_forlast_arrival = T_last_arrival      // shift
        T_last_arrival = now( )                 // look at the clock
        N_received = N_received + 1             // increase counter
2. When the timer goes of do
        calculate_and_show_changeability        // for description see below
Procedure: calculate_and_show_changeability
{
Tnow = now( )                           // look at the clock
changeability = N_received − 1
        // changeability = −1 means: no samples received
        // changeability = 0 means: exactly the amount of samples received as expected,
        //                   so no changeability
        // changeability = positive: more samples received than expected
if N_received = 0
    then
            Delta = Tnow − Tlast_arrival
                // will increase after period of no arrivals
            Twakeup = Tnow + alpha * Delta
    else
            Delta = T_last_arrival − T_forlast_arrival;
                // last real sample time
            Twakeup = T_last_arrival + alpha * Delta
                // do not calculate from now!
            if Twake up < =Tnow; then Twakeup = Tnow + alpha * Delta;
N_received = 0;   // reset the counter
Return(changeability)       // return the changeability as output parameter
SetTimer(Twakeup)           // set timer to go off at T_wakeup
                            // and go to sleep
}
```

In a still further embodiment of the sensor monitoring system and/or the processing unit, a maximum allowable value (Delta) is defined for the said duration (variant B).

If during a longer time no samples are arriving, the sleep time Delta will increase. To prevent windup, a parameter Dmax is introduced. The idea: if Delta exceeds Dmax, use Dmax for the calculation of Twakeup.

The sensor monitoring system and/or the processing unit may function according the following "pseudo" code:

```
Config
D_init = 10     // to start the system an initial sleep-time value is configured
D_max = 100     // to prevent windup a maximum sleep time is configured
Init
T_forlast_arrival = 0
T_last_arrival = 0
Tnow = 0
N_received = 0
SetTimer(D_init)                // go to sleep for time = D_init
Two parallel processes (endless)
```

```
1. When a sample arrives do
      T_forlast_arrival = T_last_arrival     // shift
      T_last_arrival = now( )                // look at the clock
      N_received = N_received + 1            // increase counter
2. When the timer goes of do
      calculate_and_show_changeability
Procedure: calculate_and_show_changeability
{
Tnow = now( )                                // look at the clock
changeability = N_received − 1
      // changeability = −1 means: no samples received
      // changeability = 0 means: exactly the amount of samples received as expected,
      //                  so no changeability
      // changeability = positive: more samples received than expected
if Nreceived = 0
      then
            Delta_calc = Tnow − Tlast_arrival;
                  // temporary variable
            Delta = min (Dmax, Delta_calc)
                  // maximized to Dmax
            Twakeup = Tnow + Delta
      else
            Delta_calc = T_last_arrival − T_forlast_arrival
                  // compare to last real sample time
            Delta = min (Dmax, Delta_calc );
                  // maximized to Dmax
            Twakeup = T_last_arrival + Delta
                  // do not calculate from now!
                  // prevent to look in the past (will happen when the calculated
                  // Twakeup <= Tnow) do the following:
            if (Twakeupt<= Tnow)
                  twakeuptime = tnow + delta;
                        // start looking delta from now
N_received = 0;   // reset the counter
Return(changeability)           // return the changeability as output parameter
SetTimer(Twakeup)               // set timer to go off at T_wakeup
                                // and go to sleep
}
```

In a still further embodiment of the sensor monitoring system and/or the processing unit a minimum allowable value (Dmin) is defined for the said duration. [variant C, F].

If samples are arriving at high frequency (for example every millisecond), it will cost a lot of CPU power to calculate the changeability every millisec. Therefore the use of Dmin is introduced. The next time interval to wake up is at least Dmin. The idea: if the calculated Delta is smaller then Dmin, use Dmin for next calculation. But that is not enough. Until now, we used to expect 1 sample to arrive when the timer goes off. But in the case Dmin is 1 second and the samples are expected to arrive every millisecond, the expected number of arrived samples is 1000. Therefore we will use the new parameter Nexpected. This parameter is also used to calculate the changeability:

changeability=(N_received−N_expected)/N_expected;

In the case Nexpected=1; the changeability formula is: (Nreceived−1)/1=Nreceived−1 (this is the same as in the basic case of Variant A).

Dmin is typically used if a very high sample rate is expected. The sensor monitoring system and/or the processing unit may function according the following "pseudo" code:

```
Config
D_init = 10   // to start the system an initial sleep-time value is configured
D_min = 10    // to prevent a sleep time which is too small
Init
T_forlast_arrival = 0
T_last_arrival = 0
Tnow = 0
N_expected=1            // normally 1 samples is expected to be arrived at wake up
N_received = 0
SetTimer(D_init)        // go to sleep for time = D_init
Two parallel processes (endless)
1. When a sample arrives do
      T_forlast_arrival = T_last_arrival     // shift
      T_last_arrival = now( )                // look at the clock
      N_received = N_received + 1            // increase counter
2. When the timer goes of do
      calculate_and_show_changeability
Procedure: calculate_and_show_changeability
{
Tnow = now( )                                // look at the clock
changeability = (N_received − N_expected) / N_expected;
      // changeability = negative means: less received than expected
```

```
// changeability = -1 means: no samples received
// changeability = 0 means: exactly the amount of samples received as expected,
//           so no changeability
// changeability = positive: more samples received than expected
N_expected = 1;          // reset N_expected
if Nreceived = 0
    then
            // for at least Dmin secs there was no arrival (N_received = 0 and
            // system slept for Dmin sec)
            Delta_calc = Tnow - Tlast_arrival;
                  // so this is bigger then Dmin
            Delta = max (Dmin, Delta_calc)
                  // minimize to Dmin ;
                        // in practise only used in init phase
            Twakeup = Tnow + Delta
                  // Note: Nexpect is not recalculated
                        // because we expect 1 sample
    else
            // we received samples
            Delta_calc = T_last_arrival - T_forlast_arrival
                  // compare to last real sample time
            Delta= Delta_calc
            if Delta < Dmin then
                    Delta = Dmin                    //
minimize to Dmin
                    N_expected = Delta / Delta_calc
    // re-calculate N_expected
            Twakeup = T_last_arrival + Delta
                  // do not calculate from now!
                  // to prevent to look in the past (will happen when the calculated
                  // Twakeup <= Tnow) do:
        if (Twakeupt<= Tnow) then Ttwakeupe = Tnow + delta;
                  // wakeup delta from now
N_received = 0;           // reset the counter
Return(changeability)     // return the changeability as output parameter
SetTimer(Twakeup)         // set timer to go off at T_wakeup
                          // and go to sleep
}
```

In a still further embodiment (variant F) the processing unit is arranged to extend the basic algorithm (variant A) with both Dmax and Dmin (combination of options B and C).

The sensor monitoring system and/or the processing unit may function according the following "pseudo" code:

```
Config
D_init = 10     // to start the system an initial sleep-time value is configured
D_max = 100    // to prevent windup a maximum sleep time is configured
D_min = 10     // to prevent a sleep time which is too small
Init
T_forlast_arrival = 0
T_last_arrival = 0
Tnow = 0
N_expected=1           // normally 1 samples is expected to be arrived at wake up
N_received = 0
SetTimer(D_init)       // go to sleep for time = D_init
Two parallel processes (endless)
1.When a sample arrives do
    T_forlast_arrival = T_last_arrival    // shift
    T_last_arrival = now( )               // look at the clock
    N_received = N_received + 1           // increase counter
2. When the timer goes of do
    calculate_and_show_changeability
Procedure: calculate_and_show_changeability
{
Tnow = now( )                         // look at the clock
changeability = (N_received - N_expected) / N_expected;
    // changeability = negative means: less received than expected
    // changeability = -1 means: no samples received
    // changeability = 0 means: exactly the amount of samples received as expected,
    // so no changeability
    // changeability = positive: more samples received than expected
Nexpected = 1;                        // reset Nexpected
if Nreceived = 0
```

```
            then
                        Delta_calc = Tnow − Tlast_arrival;
                        Delta = min ( Dmax, Delta_calc)
                            // maximized to Dmax
                        Delta = max (Dmin, Delta)
                            // minimized to Dmin
                        Twakeup = Tnow + Delta
            else
                        Delta_calc = T_last_arrival − T_forlast_arrival
                                // compare to last real sample time
                        Delta = min (Dmax, Delta_calc );
                            // maximized to Dmax
                        if Delta < Dmin
                            Delta = Dmin
                                // minimize to Dmin
                            Nexpect = Delta / Deltacalc
                                // calculate Nexpect
                                // this will only be calculated if Delta< Dmin
                        Twakeup = T_last_arrival + Delta
                                // do not calculate from now!
                        // to prevent to look in the past (will happen when the calculated
                        // Twakeup <= Tnow) do the following:
                        if (Twakeupt<= Tnow) then Twakeup= Tnow + delta;
                                // start looking delta from now
    N_received = 0;         // reset the counter
    Return(changeability)   // return the changeability as output parameter
    SetTimer(Twakeup)       // set timer to go off at T_wakeup
                            // and go to sleep
}
```

In a still further embodiment of the sensor monitoring system and/or the processing unit the processing unit is further arranged to assign data acquisition window corresponding to a duration of a number of successive data transmission events.

Variant E

Parameters to be Configured:

Dinit=minimum delta-time for timer to go off next time (in init fase)

window size=the number of received-values used to calculate the average wakeup time using window size=1 the same situation as algorithm A is obtained the bigger the window size the "slower" the response on changes if the window size =1 the changeability will be extremely sensative for samples with a small deviation in time of arrival (eg. with delta of 69, 61, 60, 59 secs)

normally the window will be between 3 and 10 the bigger the window size, the longer it will take to detect that there is no signal coming in at all N_expected=number of expected samples at wakeup time Output changeability=changeability of the received signal, 0 means: no changeability a positive number: more samples received than expected a negative number: less samples received than expected Other Parameters Delta="temporary variable": used for calculating new wakeup time T_wakeup=the time the timer went of and the next sequence of calculating is started N_received=the received amount of signal inputs when the timer went off T_last_arrival=last time a sample arrived T_forlast_arrival=time before the last time a sample arrived list-array

|  | N_expected | N_received | T_wakeup |
|---|---|---|---|
| 0 |  |  | oldest |
| 1 |  |  |  |
| 2 |  |  |  |
| ... |  |  |  |
| windowsize | pre-filled in at previous arrival | filled in at new arrival | pre-filled in at previous arrival | length of array=window size+1 (so: for window size=1→length=2)

E=temporary variable to calculate all expected samples in list-array (i.e. column 1)

R=temporary variable to calculate all received samples in list-array (i.e. column 2)

The sensor monitoring system and/or the processing unit may function according the following "pseudo" code:

```
Config
D_init = 10     // to start the system an initial sleep-time value is configured
windowsize = 3  // as example
N_expected = 1
Init
T_forlast_arrival = 0
T_last_arrival = 0
Tnow = 0
N_received = 0
list-array(index=0) = {N_expected, N_received, D_init}
R=0;
```

```
-continued

E=0;
SetTimer(D_init)        // go to sleep for time = D_init
Two parallel processes (endless)
1. When a sample arrives do
        T_forlast_arrival = T_last_arrival          // shift
        T_last_arrival = now( )                     // look at the clock
        N_received = N_received + 1                 // increase counter
            update_list-array_with_Nreceived_at-last-row
                    // update the "N_received-column" of list-array with N_received
                    // at the most recent row
2. When the timer goes of do
        calculate_and_show_changeability // for description see below
Procedure: calculate_and_show_changeability
{
Tnow = now( )           // look at the clock
R = sum{list-array_column_Nreceived(index=1) :
                        list-array_column_Nreceived(index=length(list-array))}
E = sum{list-array_column_Nexpected(index=1) :
                        list-array_column_Nreceived(index=length(list-array))}
// note the use of index=1!
timespan = list-array_colomn Twakup(index=last) − list-array_colomn
Twakup(index=0)
changeability = (R − E) / E
    // changeability = negative: less examples arrived than expected in window size
    // changeability = −1 means: no samples received in window size
    // changeability = 0 means: exactly the amount of samples received as expected,
    //                            so no changeability
    // changeability = positive means: more samples received than expected
if R = 0                // check if there are received samples in window
    then
                    // in this case there are no received samples in window
                    Delta = Tnow − Tlast_arrival
                            // will increase after period of no arrivals
                    Twakeup = Tnow + Delta
    else
                    // in this case there are indeed received samples in window
                    Delta = timespan/length(list-array)
                            // average within windowsize
                    Twakeup = T_last_arrival + Delta
                        // do not calculate from now!
                    if Twake up < =Tnow; then Twakeup = Tnow + Delta;
N_received = 0;    // reset the counter
// update the list-array
if length(list-array) < window size
    then
                    {
                    // the list-array was not filled completely
                       extend_list-array_with_one_row_at_end
                            // add row at the bottom
                       update_list-array_lastrow (N_expected, N_received, Twake_up)
                            // give values this last row
                    }
            else
            {                                       // the list-array
was already filled
                    // so we have to make a row shift
                       delete_first_row_from-list-array
                            // delete the row ith oldest values
                       extend_list-array_with_one_row_at_end
                            // add row at bottom
                       update_list-array_lastrow (N_expected, N_received, Twake_up)
                            // give values to this last row
                    }
Return(changeability)   // return the changeability as output parameter
SetTimer(Twakeup)       // set timer to go off at T_wakeup
                    // and go to sleep
}
```

A still further embodiment (Variant G), is based on a combination of variant D and F. Note: using alpha=1.0 variant F is regained.

The sensor monitoring system and/or the processing unit may function according the following "pseudo" code:

```
Config
D_init = 10    // to start the system an initial sleep-time value is configured
D_max = 100    // to prevent windup a maximum sleep time is configured
D_min = 10     // to prevent a sleep time which is too small
alpha = 1.1    // to make the algorithm less sensitive for small deviations in
               // sample time
Init
T_forlast_arrival = 0
T_last_arrival = 0
Tnow = 0
N_expected=1       // normally 1 sample is expected to be arrived at wake up
N_received = 0
SetTimer(D_init)   // go to sleep for time = D_init
Two parallel processes (endless)
1.When a sample arrives do
    T_forlast_arrival = T_last_arrival    // shift
    T_last_arrival = now( )               // look at the clock
    N_received = N_received + 1           // increase counter
2. When the timer goes of do
    calculate_and_show_changeability
Procedure: calculate_and_show_changeability
{
Tnow = now( )                             // look at the clock
changeability = (N_received − N_expected) / N_expected;
    // changeability = negative means: less received than expected
    // changeability = −1 means: no samples received
    // changeability = 0 means: exactly the amount of samples received as expected,
    //                  so no changeability
    // changeability = positive: more samples received than expected
Nexpected = 1;              // reset Nexpected
if Nreceived = 0
    then
        Delta_calc = Tnow − Tlast_arrival;
        Delta = min ( Dmax, alpha * Delta_calc)
                // sleep a factor alpha longer,
                // but maximized to Dmax
        Delta = max (Dmin, Delta)
                // minimized to Dmin
        Twakeup = Tnow + Delta
    else
        Delta_calc = T_last_arrival − T_forlast_arrival
                // compare to last real sample time
        Delta = min (Dmax, alpha * Delta_calc );
                // sleep a factor alpha longer,
                // but maximized to Dmax
        if Delta < Dmin
            Delta = Dmin
                // minimize to Dmin
                // but don't use alpha!
        Nexpect = Delta / Deltacalc
                // calculate Nexpect
        Twakeup = T_last_arrival + Delta
                // do not calculate from now!
            // prevent to look in the past (will happen when the calculated
            // Twakeup <= Tnow)
        if (Twakeupt<= Tnow) then Twakeup= Tnow + delta;
            // start looking delta from now
N_received = 0;           // reset the counter
Return(changeability)     // return the changeability as output parameter
SetTimer(Twakeup)         // set timer to go off at T_wakeup
                          // and go to sleep
}
```

The method according to the invention for monitoring a sensor system comprising at least one sensor and a processing unit, wherein the sensor is arranged to transmit during a plurality of successive time periods data items to the processing unit and the processing unit is arranged to receive the data items from the said at least one sensor, comprises the steps of:

determining for at least some time periods from the said plurality of successive time periods a number of corresponding data items;

comparing between at least some time periods the number of the corresponding data items;

deducing for at least some time periods a parameter associated with a variation in the number of data items per said some time periods.

The computer program product according to the invention comprises instructions for causing a processor to carry out the steps of the method as is set forth in the foregoing.

These and other aspects of the invention will be discussed with reference to drawings wherein like reference signs correspond to like elements. It will be appreciated that the drawings are presented for illustrative purposes only and may not be used for limiting the scope of the appended claims.

DETAILED DESCRIPTION OF THE DRAWINGS

Figure 1:
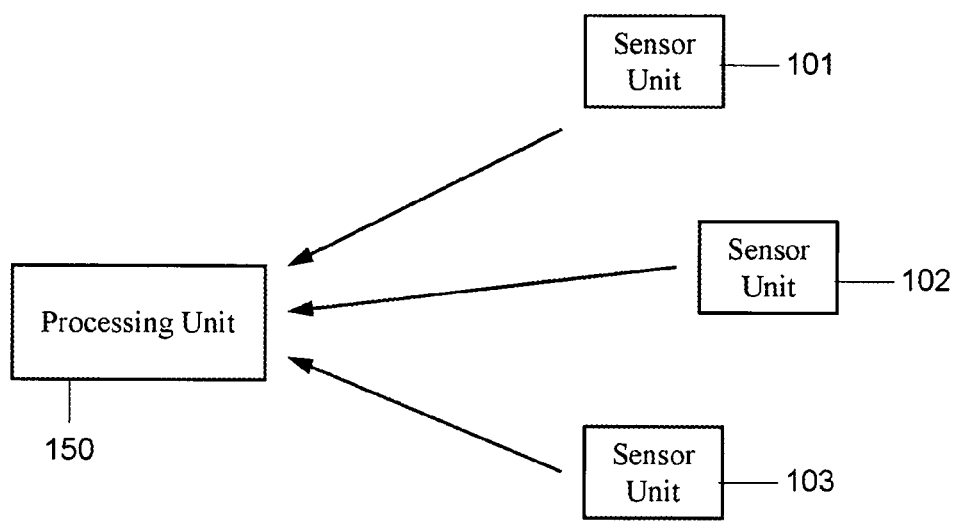
FIG. 1 presents in a schematic way an embodiment of a system according to the invention.

FIG. 1 presents in a schematic way an embodiment of a system according to the invention. The sensor system shown merely by way of non-limiting example in FIG. 1 comprises several sensor units 101, 102, 103, . . . and a processing unit 150. The sensor units 101, 102, . . . each may contain one or more sensors and a transmitter for transmitting data items to the processing unit. The data items may contain (sampled) values determined by the sensors. As explained above, the data items may be referred to as "samples". However, in most embodiments the data items are constituted by data packets having a header and a payload, the payload comprising one or more sensor values. The transmitter may be configured for transmission by wire (copper of fiber optic cable), and/or for wireless transmission. The sensor units are preferably not polled by the processing unit but transmit their data items autonomously, for example regularly and/or upon detection of a change in the sensed value.

As will be explained in more detail below, the sensor units 101, 102, . . . are configured for transmitting data items to the processing unit 150. In addition, the processing unit 150 is configured for determining, during a plurality of time periods, the number of data items received in each time period, comparing, for each time period, the number of data items received with the number of data items received in previous time periods, and determining, for each time period, a measure of change in the number of data items received.

In the present invention, a so-called sample rate of each sensor unit is determined by the processing unit. This sample rate is the typical rate at which data items are received from the respective data unit and is "learned" during a training period. This training period typically comprises several time periods (time windows). In each new time period, the data item receiving rate is compared with the historic rate and this comparison is then used to calculate a measure of change, also referred to as "changeability". In an embodiment, this measure may equal to zero when there is no change in the rate, may be smaller than zero when the rate has decreased and may be larger than zero when the rate has increased. A special value NULL may be used for situations where no single sample has been received in a certain period of time.

In a preferred embodiment, the processing unit comprises (or is coupled to) programmable timers. During each step of the method, the expected waiting time (e.g. the number of seconds) for a new data item is determined; this expected waiting time is referred to as "wakeup time" Triggered by a timer, the number of data items received in the time period is determined, and this number may be equal to one. If this number is normally equal to one, then the "changeability" is equal to zero. However, if a data item arrives only slightly late, then the measure of change will be high, even though hardly any change may have occurred. To avoid this, it is preferred to use a buffer having an adjustable size. If the buffer size is equal to (or set to) five, then the wake-up time may be set to five times the determined "sample time" (that is, the time period between data items). If one of those five samples fails to arrive within the time period, then the measure of change will be negative, but not as negative as in the case above in which the single data item failed to arrive. In other words, the effect of a single data item arriving slightly late is dampened. The processing unit may be arranged to carry out the steps of the data acquisition and processing as is set out with respect to any of the examples described above.

Figure 2:
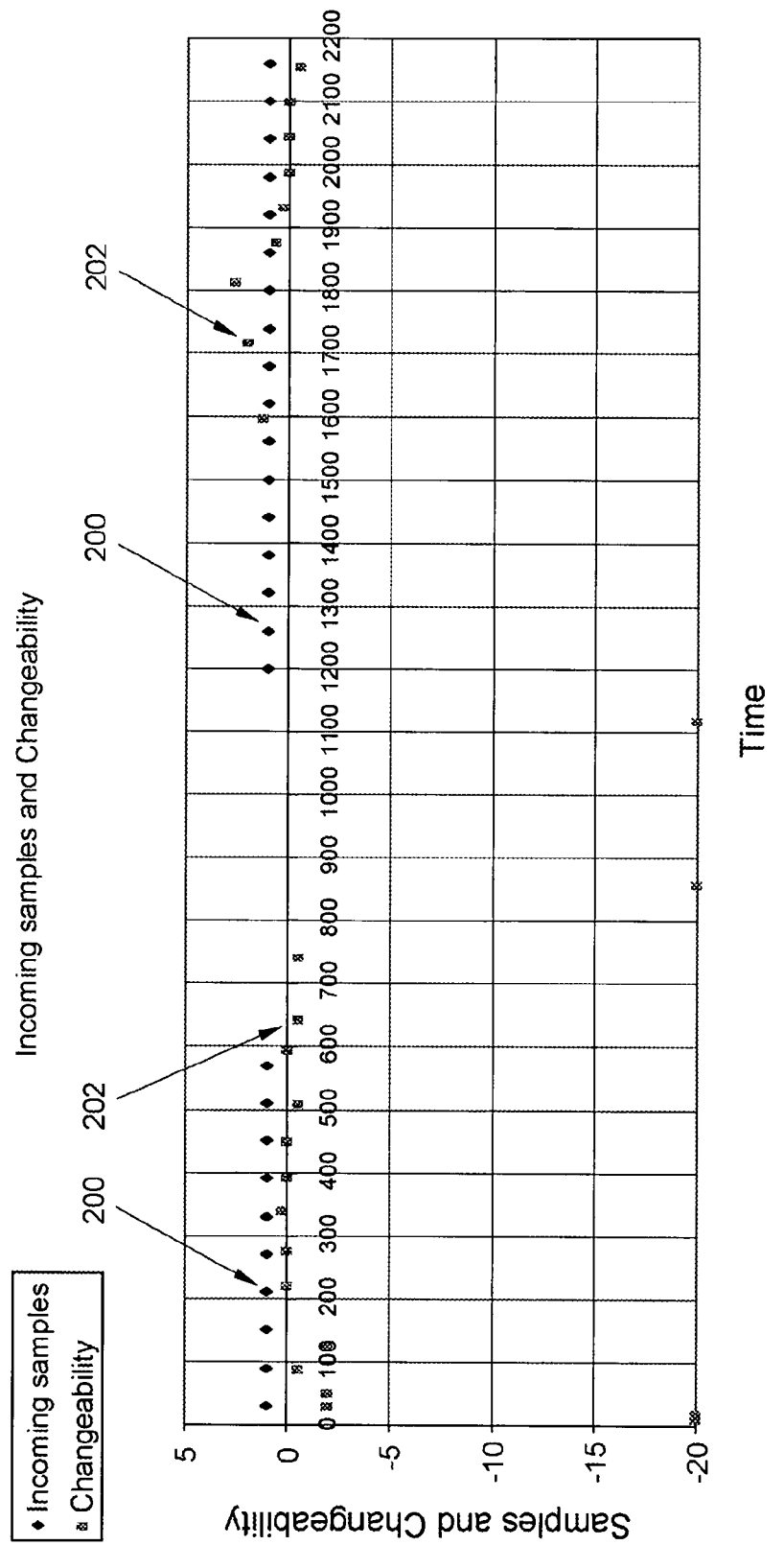
FIG. 2 presents in a schematic way a parameter of the variation in the data items.

FIG. 2 presents in a schematic way a parameter of the variation in the data items. It will be appreciated that in accordance with an insight of the present invention data variability, expressed in a measure of change or "changeability", can be used effectively to monitor and detect unusual conditions in a sensor network, in particular in a non-polled sensor network. A series of data 200 represents incoming samples wherein a series of data 202 represents the determined changeability.

While specific embodiments have been described above, it will be appreciated that the invention may be practiced otherwise than as described. Moreover, specific items discussed with reference to any of the isolated drawings may freely be inter-changed supplementing each outer in any particular way. The descriptions above are intended to be illustrative, not limiting. Thus, it will be apparent to one skilled in the art that modifications may be made to the invention as described in the foregoing without departing from the scope of the claims set out below.

The invention claimed is:

1. A sensor monitoring system comprising at least one sensor and a processing unit comprising a buffer, wherein the sensor transmits data items autonomously, each of the data items comprising at least one sensor value, and is arranged to transmit during a plurality of successive time periods data items to the processing unit and the processing unit is arranged to receive the data items from the said at least one sensor and the buffer is arranged to buffer an amount of data items, the processing unit being further arranged for:
   determining for two or more time periods from the said plurality of successive time periods a number of corresponding data items received during an expected waiting time;
   detecting a duration (Delta) between the successive transmissions of the data items;
   setting the expected waiting time for determining the number of data items based on the detected duration and the amount of data items the buffer is arranged to buffer;
   comparing between the two or more time periods the number of the corresponding data items; and
   deducing for the two or more time periods a measure of change in the number of data items per said two or more time periods.

2. The sensor monitoring system according to claim 1, wherein said determining, comparing and deducing is carried out for each time period forming the said plurality of time periods.

3. The sensor monitoring system according to claim 1, wherein the said measure of change is used for triggering an alarm when the measure of change exceeds a threshold.

4. The sensor monitoring system according to claim 3, wherein a value of the threshold is pre-determined, or wherein a value of the threshold is determined dynamically.

5. The sensor monitoring system according to claim 1, wherein the processing unit comprises a buffer for buffering the data items is an adjustable buffer.

6. The sensor monitoring system according to claim 1, wherein the at least one sensor is configured for transmitting the said data items wirelessly.

7. The sensor monitoring system according to claim 1, wherein a maximum allowable value (Dmax) is defined for the said duration.

8. The sensor monitoring system according to claim 1, wherein a minimum allowable value (Dmin) is defined for the said duration.

9. The sensor monitoring system according to claim 1, wherein the processing unit is further arranged to assign data acquisition window corresponding to a duration of a number of successive data transmission events.

10. A processing unit comprising a buffer, the processing unit for use in a sensor monitoring system comprising at least one sensor, wherein the sensor transmits data items autonomously, each of the data items comprising at least one sensor value, and is arranged to transmit during a plurality of successive time periods data items to the processing unit and the processing unit is arranged to receive the data items from the said at least one sensor being further arranged for:
   a. determining for two or more time periods from the said plurality of successive time periods a number of corresponding data items received during an expected waiting time;
   b. comparing between the two or more time periods the number of the corresponding data items;
   c. detecting a duration (Delta) between the successive transmissions of the data items;
   d. setting the expected waiting time for determining the number of data items based on the detected duration and the amount of data items the buffer is arranged to buffer; and
   e. deducing for two or more time periods a measure of change in the number of data items per said two or more time periods.

11. A method for monitoring a sensor system comprising at least one sensor and a processing unit comprising a buffer, wherein the sensor transmits data items autonomously, each of the data items comprising at least one sensor value, and is arranged to transmit during a plurality of successive time periods data items to the processing unit and the processing unit is arranged to receive the data items from the said at least one sensor and the buffer is arranged to buffer an amount of data items, the method comprising the steps of:
   determining for two or more time periods from the said plurality of successive time periods a number of corresponding data items received during an expected waiting time;
   detecting a duration (Delta) between the successive transmissions of the data items;
   setting the expected waiting time for determining the number of data items based on the detected duration and the amount of data items the buffer is arranged to buffer;
   comparing between the two or more time periods the number of the corresponding data items;
   deducing for the two or more time periods a measure of change in the number of data items per said two or more time periods.

12. A computer program product comprising instructions for causing a processor to carry out the steps of the method as is claimed in claim 11.

13. The system of claim 1 comprising a previously presented time period having a respective data item receiving rate; and the processing unit compares the previously presented time period data item receiving rate to a historic rate to calculate a measure of change.

14. The system of claim 1 wherein the processing unit comprises a programmable timer; and
   the programmable timer determines the expected waiting time based on the detected duration and the amount of data items the buffer is arranged to buffer.

15. The sensor monitoring system of claim 1 wherein the processing unit is arranged for:
   determining for the two or more time periods from the said plurality of successive time periods sample rate of the sensor as a typical rate at which data items are received from the sensor;
   comparing between the two or more time periods the corresponding sample rates; and
   deducing for the two or more time periods a measure of change in the sample rates per said two or more time periods.

16. The sensor monitoring system of claim 1 wherein the processing unit is configured for determining, based on the detected duration, a time period for determining the number of transmitted data items.

17. The sensor monitoring system of claim 1 wherein the expected waiting time for determining the number of data items is based on the detected duration multiplied by the amount of data items the buffer is arranged to buffer.

18. The sensor monitoring system of claim 1 wherein the processing unit is further arranged for:
   setting the waiting time at a pre-determined value;
   determining whether data items have been transmitted during the waiting time; and
   if no data items have been transmitted during the waiting time, increase the waiting time.

19. The sensor monitoring system of claim 1 wherein the deducing comprises calculating a changeability value with the equation $$\text{changeability value} = (N\_received - N\_expected)/N\_expected;$$

wherein
N_expected is the number of data items expected to be received during the expected waiting time in a first time period; and
N_received is the received number of data items during the expected waiting time in a second time period, the second time period following the first time period.

20. The sensor monitoring system of claim 1 wherein he data items are packets having a header and a payload, the payload comprising one or more sensor values.

* * * * *